No. 619,885.  
H. DE C. HAMILTON.  
VOLTAIC BATTERY.  
(Application filed Mar. 17, 1896.)  
Patented Feb. 21, 1899.
(No Model.)
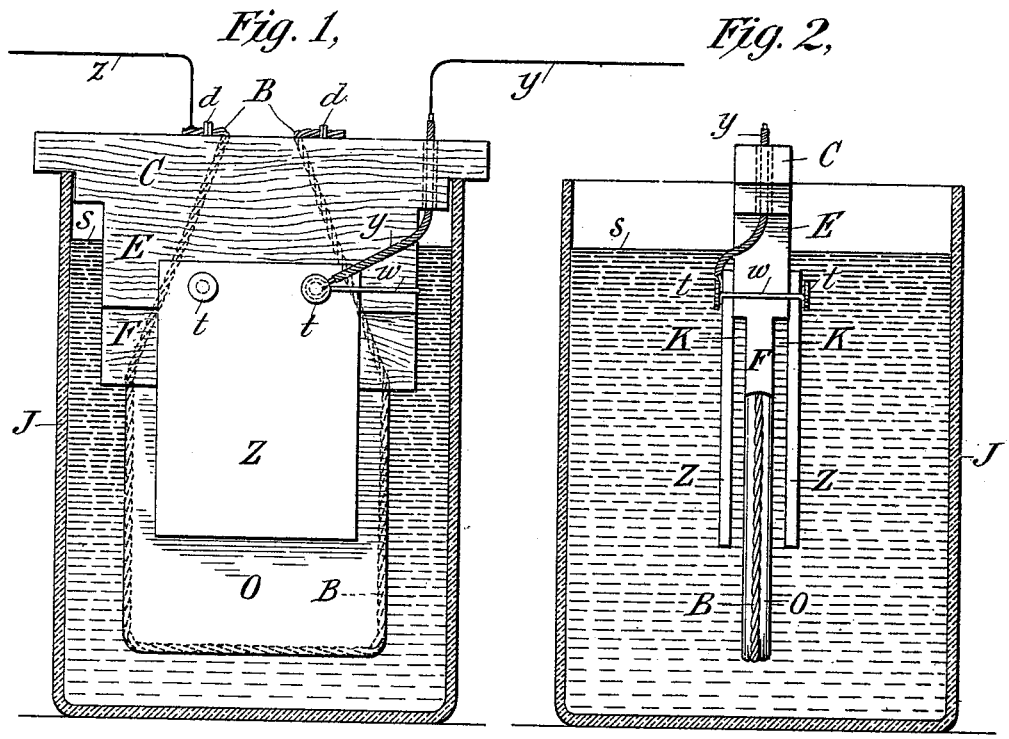
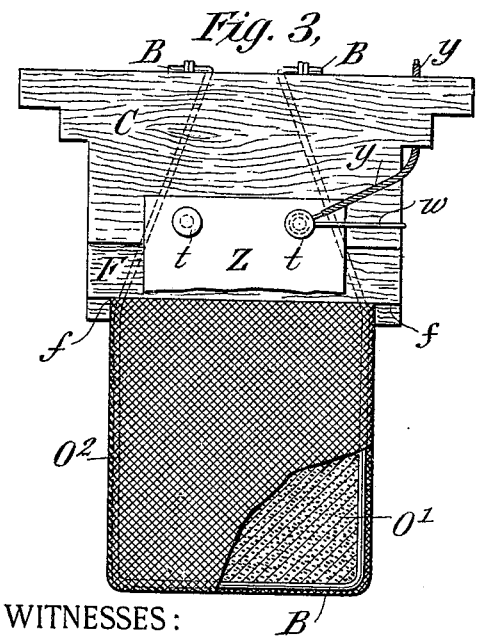
WITNESSES:  
C. E. Ashley  
Frank Ryall
INVENTOR:  
Hugh de C. Hamilton  
By his Attorneys  
Wilson, Barkley & Brodek

UNITED STATES PATENT OFFICE.

HUGH DE C. HAMILTON, OF NEW YORK, N. Y.

VOLTAIC BATTERY.

SPECIFICATION forming part of Letters Patent No. 619,885, dated February 21, 1899.

Application filed March 17, 1896. Serial No. 583,562. (No model.)

*To all whom it may concern:*

Be it known that I, HUGH DE C. HAMILTON, a citizen of the United States, and a resident of New York city, in the county of New York and State of New York, have invented certain new and useful Improvements in Voltaic Batteries, of which the following is a specification.

In a certain class of voltaic batteries heretofore in use an oxid-of-copper depolarizer, zinc anode, and an electrolyte containing caustic soda have been used. In this prior construction the depolarizing material has been supported beneath a porcelain cover-plate which was provided with a rectangular rib on its under side, the depolarizer being supported beneath said rib by means of two channel-bars which pass through said bridge at the ends of said rib and by a channeled cross-bar pivoted to the ends of said two (upright) channel-bars, the said depolarizer being in the form of a solid plate and being caught by its edges in all of said channeled bars, and the bars and plate being narrower than the said rib two zinc plates are supported beneath the cover or bridge plate at the sides of said rib. The depolarizer in said prior construction extends nearly to said rib, and any loose oxid of copper floats or rises and forms a short-circuiting bridge between the upright channel-bars (of copper) and the zincs, (and also the plate of oxid of copper when this rises sufficiently high in the cell or jar,) thus short-circuiting the battery to a greater or less extent, inasmuch as such floating oxid of copper is pocketed or caught between the zincs and the upright bars, (and the plate of depolarizer when sufficiently high in the cell or jar.) Another serious objection to said prior construction is that all parts, except the zincs and the oxid of copper, are intended for permanent use. The oxid of copper and the zincs are renewed from time to time. To replace the zincs and the depolarizer by new plates, it is requisite that the cover-plate and the parts attached thereto and all be removed from the cell (except the electrolyte) and that the bars for retaining the plate of oxid of copper at least be handled. The caustic electrolyte adhering to these parts affects the hands very injuriously, thus constituting a serious objection to this construction.

The present invention relates to voltaic batteries wherein a depolarizer is employed, and has the avoidance of the foregoing objections for its main object.

Another object is the provision of a hanger of such an inexpensive nature for the electrodes, the anode, the cathode, and the depolarizer (whereby the anode, the cathode, and the depolarizer may be wholly submerged) that after the exhaustion of the anode and depolarizer the whole outfit, except the cell and electrolyte, may be thrown aside and be replaced by a new hanger, zincs, depolarizer, and fastenings.

Another object of the invention is the increase of the efficiency and life of the battery.

To these and other ends the invention includes features of construction and combinations of devices hereinafter described, and more particularly pointed out in the appended claims.

The preferred form of the invention is shown in the accompanying drawings, forming part of this specification, in which—

Figure 1 is a view, partly in section, of a jar, a side of the new hanger, the depolarizer, and connections. Fig. 2 is a cross-sectional view of the jar with the hanger, &c., in end elevation; and Figs. 3 and 4 are views of a modification of the hanger and other parts.

The same letter of reference will be found to indicate the same part in the various figures of the drawings.

The reference letter J indicates a jar or cell, which may be of any usual or suitable construction or form.

C indicates a bridge-piece, preferably of oblong or elongated form, which lies across the top of the jar and is adapted to rest thereon. Beneath the bridge C is an oblong extension E, which lies within the jar and whose vertical sides are substantially parallel. In the normal use of this invention the extension E extends below the surface s of the electrolyte. Below the extension E is a flange F, which extends longitudinally and centrally of the extension E—*i. e.*, there are jogs or shoulders where the flange F joins the extension E. The vertical faces or sides of the flange F are substantially parallel to the adjacent vertical faces or sides of the extension E. The bridge C, extension E, and flange F form the hanger and are preferably formed in one piece of insulating material, which is neutral with respect to the electrolyte employed. I find that wood impregnated with ashpaltum, paraffin, or the like answers very well for this purpose. Zinc plates Z are attached to the extension E at the vertical sides thereof, as by rivets or tacks $t$, thus leaving clear spaces or inverted troughs or trough-like openings K between the sides of the zincs, the extension E, and the flange F. These spaces have an important function in this invention, as will hereinafter more fully appear. The zincs are in electrical connection with each other, as by means of a wire $w$, which passes under the heads of the rivets or tacks $t$ and around one end of the extension E, as shown. The depolarizing oxid of copper may be in the form of a solid plate O, having three edges grooved longitudinally, or the depolarizer may be in the form of granules or in a loose form and be held by a suitable vessel, as will be explained hereinafter. The hanger is provided with two vertically-extending holes or perforations in the bridge C, extension E, and flange F for the reception of a copper wire B, which lies in the said grooves in the edges of the plate O and whose ends are turned over the top of the bridge C and are fastened thereto by wire staples $d$ or the like. The wire B thus supports or carries the plate O and keeps the upper rounded or convex edge thereof in the correspondingly-grooved bottom edge of the flange F, as shown in Fig. 2. The zincs and the wire B are respectively provided with wires $z$ and $y$ for connecting them to the line. The wire $z$ preferably passes through a hole in the bridge to the zinc anode.

In the modification shown in Figs. 3 and 4 the flange F is shown as being provided with longitudinal rabbets or shoulders $f$ at its lower corners or edges. The cathode consists of a cup $O^2$, of wire-gauze or perforated sheet metal, as copper, provided with a groove along its side edges and bottom to receive a wire B, by means of which it is secured to the hanger. The open top of the cup fits over the thinner portion of flange F and may bear against shoulders $f$. In case the flange is longer than the cup is across its top the thinner part of the flange may be cut away to allow the cup to be drawn up against the shoulders, or the vertical sides or edges of the cup may be cut down sufficiently for the same purpose. The cup $O^2$ supports or carries the depolarizer, which is in a loose or granular form and is itself carried or supported by the wire B.

The wire B may be molded within the plate O in the process of manufacture thereof and its projecting ends be passed through the holes in the hanger and secured, as above set forth.

The zincs are intended to be submerged in the electrolyte, (this being the usual arrangement,) whence it results in my invention that the spaces K between the zincs, the flange F, and the extension E provide pockets in which any oxid of copper becoming detached from the plate O or escaping from the cup $O^2$ may collect without short-circuiting the battery or cell, since the cathode B (or $O^2$) and the oxid of copper are wholly protected from contact with such floating oxid by an insulator. The contact between the anode and the floating oxid in the absence of any contact or connection between the oxid and the cathode (the floating oxid is referred to, of course) exercises no injurious effect upon the battery or cell.

It is cheaper and more convenient to throw away my new hanger, the used-up zincs and depolarizer, and the other parts attached to the hanger than it is to keep the hanger, wires, &c., and replace the zincs and depolarizer with new; but this statement is not true of the aforesaid prior construction, inasmuch as its porcelain or other cover is, relatively speaking, too costly to throw away. It will thus be seen that the present invention avoids the stated objections to the prior construction and provides a simple, convenient, and inexpensive hanger for the depolarizer, anode, cathode, and other parts that go within the cell or jar.

What I claim as new, and desire to secure by Letters Patent of the United States, is—

1. In a voltaic battery, the combination of a hanger comprising a bridge adapted at its ends to rest on a cell or jar, an elongated extension beneath said bridge to go within the cell or jar and having substantially parallel vertical sides or faces, an elongated flange beneath said extension said flange being thinner than said extension and being located centrally longitudinally with respect to said extension, said bridge extension and flange being of insulating material and the vertical sides of the flange being substantially parallel to the like sides of the extension, one or more anode-plates secured to the vertical side or sides of the extension and separated from said flange by space, a depolarizer and its carrier below said flange and substantially in the plane thereof, and wire fasteners passing through said hanger and being insulated thereby and secured to the top thereof and sustaining said carrier, whereby any loose or escaping depolarizing material will be caught between the anode or anodes and the insulating-flange and will not come in contact with the depolarizer or cathode, substantially as described.

2. In a voltaic battery, the combination of a hanger comprising a bridge adapted at its ends to rest upon a cell or jar, an elongated extension beneath said bridge to go within the jar and having substantially parallel vertical sides, an elongated flange beneath said extension said flange being thinner than said extension and being located centrally longitudinally with respect to said extension, said bridge extension and flange being of insulating material and the vertical sides of the flange being substantially parallel to the like sides of the extension, one or more anode-plates secured to the vertical side or sides of the extension and separated from said flange by space, a solid plate of depolarizing material below the flange and substantially in the plane thereof, a wire passing through the hanger and fastened to the top thereof and binding said depolarizer against the flange, whereby any escaping depolarizing material will be caught between the anode or anodes and the insulating-flange and will not come in contact with the plate of depolarizing material or the cathode, substantially as described.

3. In a voltaic battery, a hanger of insulating material comprising a bridge adapted to rest on the top of a cell or jar, an elongated or oblong extension underneath said bridge and having substantially parallel vertical sides against which anode-plates may be secured, an elongated flange below said extension said flange being thinner than said extension and being located centrally longitudinally with respect thereto and adapted to form an abutment for the depolarizer carrier or plate, and two vertically-disposed perforations in said hanger for receiving a binder or fastener for the depolarizer, whereby short-circuiting through collecting escaped depolarizing material will be avoided, substantially as described.

Signed at New York, in the county of New York and State of New York, this 16th day of March, A. D. 1896.

HUGH DE C. HAMILTON.

Witnesses:
CHARLES A. BRODEK,
RICHARD W. BARKLEY.